United States Patent [19]
Earhart

[11] Patent Number: 5,815,920
[45] Date of Patent: Oct. 6, 1998

[54] METHOD OF ASSEMBLING FUEL INJECTOR PUMP COMPONENTS

[75] Inventor: Thomas E. Earhart, Middleville, Mich.

[73] Assignee: Diesel Technology Corporation, Wyoming, Mich.

[21] Appl. No.: 763,134

[22] Filed: Dec. 10, 1996

[51] Int. Cl.$^6$ ...................................................... B21K 1/24
[52] U.S. Cl. .......................................... 29/890.13; 29/517
[58] Field of Search ...................... 29/890.13, 890.126, 29/890.124, 517

[56] References Cited

U.S. PATENT DOCUMENTS

| | | | |
|---|---|---|---|
| 3,189,672 | 6/1965 | Lyman, Jr. ................................. | 29/517 |
| 3,577,850 | 5/1971 | Harris, Sr. ................................. | 29/517 |
| 5,333,836 | 8/1994 | Fukuyo et al. ........................ | 29/890.13 |

OTHER PUBLICATIONS

IBM Technical Disclosure Bulletin No. 9172, vol. 21, No. 11, pp. 4586–4587, Apr. 1979.

*Primary Examiner*—Erick R. Solis
*Attorney, Agent, or Firm*—Brooks & Kushman P.C.

[57] ABSTRACT

Methods of swaging fuel injector pump components are provided. A method of securing an armature plate to a control valve of a solenoid-actuated fuel injector pump comprises: (1) providing a control valve stem extending from the control valve, the stem having a body with a body width, a head with a head width narrower than the body width, and a neck with a neck width narrower than the head width, the neck forming an annular groove between the head and body; (2) providing a central aperture formed in the armature plate having an aperture width between the head and body widths; and (3) forcing the stem into the central aperture in a manner to cause a portion of the armature plate to deform into the groove to secure the armature plate to the stem. Also provided is a method of plugging a fuel flow passage in a fuel injector pump body, comprising: (1) providing a plug; (2) inserting the plug at least partially into the passage; and (3) swaging the plug into the passage in a manner to deform a portion of the pump body around the plug to secure the plug in the passage.

3 Claims, 7 Drawing Sheets

METHOD OF ASSEMBLING FUEL INJECTOR PUMP COMPONENTS

TECHNICAL FIELD

The present invention relates to methods of swaging adjacent fuel injector pump components, and more specifically to methods of plugging a fuel flow passage and securing an armature plate to a control valve.

BACKGROUND OF THE INVENTION

Solenoid actuated unit injectors for controlling the admission of fuel to diesel engines, particularly heavy duty trucks and marine engines, have been in common use for a number of years. Early on, the fuel control valve for admitting fuel to the pressure chamber of these devices was mechanically actuated. In more recent years, the solenoid actuated control valve has become more popular and useful in light of its quick action and the fact that it can be easily and accurately programmed with current electronically controlled engines and software systems.

In a solenoid actuated unit injector or a solenoid actuated unit pump, there is provided an electromagnetic coil for energizing an armature which is attached to a fuel control valve, which admits fuel to a pressure chamber (either in the pump or in the injector body depending upon the device). Most commonly, the control valve with attached armature plate is spring biased to a normally open position with the electromagnetic coil being in an unenergized state. Upon energization of the electromagnetic coil, a control valve, in the form of a sliding reciprocating valve, is closed momentarily until the electromagnetically coil is next de-energized. Also, the chamber or cavity within which the armature resides is fuel-filled to provide equalization of pressure on all sides of the reciprocating fuel control valve and to allow a certain degree of damping of the action of the armature plate as the electromagnetic coil is repeatedly energized and de-energized. This also helps control valve balance which refers to the action of the control valve returning home on its valve seat as the valve is closed.

In the above-referenced systems, it is common to secure the armature plate to the control valve by means of a flathead counter-sunk screw in such a manner that the screw head faces the surface of the armature that is exposed to the electromagnetic coil and the screw shank is embedded within the control valve.

Most recently, due to operating demands being made of the solenoid for more finite control of fuel emissions, including such things as pilot ejection, which requires increasing the frequency of reciprocation of the control valve, it has been noted that the counter-sunk screw and its socket pocket are a source of cavitation erosion. This is believed to be caused by the changing state of the fuel from a fluid to a gaseous state, and resultant gas bubbles being compressed and, in effect, exploding in the recess of the cavity, thereby releasing energy and causing erosion.

Another problem inherent with this type of screw is that the screw interrupts magnetic flux lines, which can adversely affect the performance of the valve.

A further problem experienced with the prior art fuel injection pump assemblies is the difficulty of plugging the ends of fuel flow channels. These fuel flow channels are typically drilled through the body from the sides of the body, and therefore require plugging at the end in which the drill bit entered the body. These flow channels are typically plugged by providing a tapered flow channel, and inserting a tapered plug in the channel. A ring of high temperature solder is placed in the channel adjacent the tapered plug, and the solder melts as the assembly is heat treated. The solder secures the plug in the channel. This process can be unduly costly for the manufacturer.

SUMMARY OF THE INVENTION

The present invention overcomes the above-referenced shortcomings of prior art fuel pumping assemblies by providing a method of swaging an armature plate to a control valve, thus eliminating the screw, and a further method of swaging a plug into a fuel flow passage.

A first aspect of the present invention provides a method of securing an armature plate to a control valve of a solenoid actuated fuel injector pump. The method comprises:

a. providing a control valve stem extending from the control valve, the stem having a body with a body width, a head with a head width narrower than the body width and a neck with a neck width narrower than the head width, the neck forming an annular groove between the head and body;

b. providing a central aperture formed in the armature plate having an aperture width between the head and body widths; and c. forcing the stem into the central aperture in a manner to cause a portion of the armature plate to deform into the groove to secure the armature plate to the stem.

Another aspect of the present invention provides a method of plugging a fuel flow passage in a fuel injector pump body, the fuel flow passage having a passage width. The method comprises:

a. providing a plug;

b. inserting the plug at least partially into the passage; and c. swaging the plug into the passage in a manner to deform a portion of the pump body around the plug to secure the plug in the passage.

Accordingly, an object of the present invention is to provide a method of securing an armature plate to a control valve in a manner which eliminates the need for a screw in order to prevent interruption of magnetic flux lines.

A further object of the present invention is to provide a method of swaging an armature plate to a control valve.

Yet another object of the present invention is to provide a method of plugging a fuel flow passage in a fuel injector pump in a manner in which manufacturing costs are reduced.

A still further object of the present invention is to provide a method of swaging a plug into a fuel flow passage in a fuel injector pump.

The above object and other objects, features and advantages of the present invention are readily apparent from the following detailed description of the best modes for carrying out the invention when taken in connection with the accompanying drawings.

BRIEF DESCRIPTION OF THE DRAWINGS

FIG. 5 shows an enlarged cut-away sectional schematic view of the assembly corresponding with FIG. 4a;

FIG. 11d shows a cut-away sectional schematic of the alternative plug after being punched into the fuel flow passage after the punch is removed;

DETAILED DESCRIPTION OF THE PREFERRED EMBODIMENTS

Figure 1:
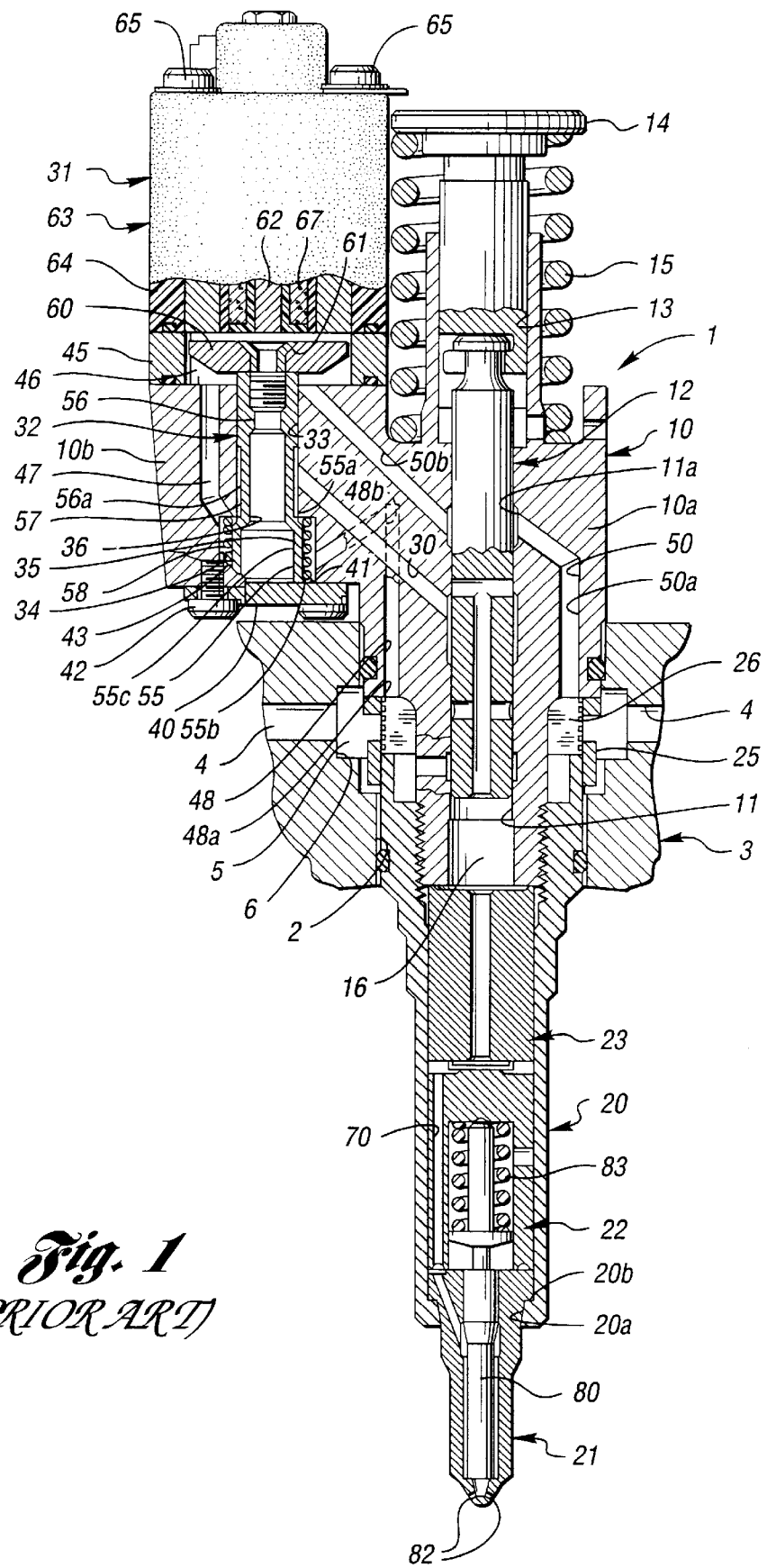
FIG. 1 is a longitudinal sectional view of a prior art electromagnetic unit fuel injector of the type in which the present invention may be incorporated into the armature plate, control valve and fuel flow passage.

Referring first to FIG. 1, there is shown an electromagnetic unit fuel injector known in the prior art, as shown in U.S. Pat. No. 4,618,095, assigned to the assignee of the subject invention, the teachings of which are incorporated herein by reference, and which is shown here for the purpose of describing the general environment of a prior art fuel injector in which the methods of the present invention are intended for use.

An electromagnetic unit injector, generally designated 1 is adapted to be mounted in a suitable bore or injector socket 2 in the cylinder head 3 of a diesel engine so that the lower spray tip end of the injector projects from the cylinder head 3 for the discharge of fuel into the associate combustion chamber, not shown.

The electromagnetic unit fuel injector 1 is, in effect, a unit fuel injector-pump assembly with an electromagnetically actuated, normally open control valve incorporated therein to control fuel discharge from the injector portion of this assembly in a manner to be described.

In the construction illustrated, the electromagnetic unit fuel injector 1 includes an injector body 10 which is defined by a vertical main body portion 10a and in integral side body portion 10b. The body portion 10a is provided with a vertical extending stepped bore therethrough to provide a lower cylindrical wall defining a cylinder or bushing 11 of an internal chamber to slidably and sealingly receive a pump plunger 12 and an upper wall 13 of a larger internal diameter than that defining the bushing. An actuator follower is operatively connected to the upper outward portion of the plunger 12 whereby it and the plunger are adapted to be reciprocated, for example, by an engine driven camshaft in a known manner, a plunger return spring 15 is operatively connected to the plunger 12 to normally bias it in a suction stroke direction.

The pump plunger 12 forms with the bushing 11 and variable volume pump chamber 16 at the lower open end of the bushing 11. A nut 20 is threaded to the lower end of the body and has an opening 20a at its lower end through which extends the lower end of a combined injector valve body or spray tip 21. Between the spray tip 21 and the lower end of the injector body 10 there is positioned a spring cage 22, and a director cage 23.

The cylinder head 3 is provided with a single flow through fuel passage 4 which serves as both a fuel supply passage and a drain passage to and from the injector 1, this fuel passage 4 being located so as to be in flow communication with an annular shaped cavity 5 defined by stepped annular groove 6 provided for this purpose in the socket 2 of the cylinder head 3.

The basic flow of fuel to the pump chamber 16 and drain flow therefrom is by means of a supply/drain passage means 30 having the flow therethrough controlled by a solenoid, generally designated 31, actuated control valve 32.

For this purpose, the side body portion 10b is provided with a stepped bore therethrough to define circular internal walls, including an upper valve stem guide wall 33 of predetermined internal diameter and a lower wall 34 of substantially larger internal diameter than that of guide wall 33, these walls being interconnected by flat shoulder 35 that terminates with a small inclined wall defining an annular, conical valve seat and encircling guide wall 33.

In the construction illustrated, a closure cap 40 with a central upstanding boss 41 is secured by screws 42 to the lower surface of the side body portion 10b so as to be concentric with lower wall 34 whereby to define with this wall 34 and shoulder 35 a supply/drain chamber 43. A hollow solenoid spacer 45, sealingly and suitably secured in sandwiched relationship between the lower surface of the solenoid 31 and the flat upper surface of the side body portion 10b in substantially encircling relationship to the valve stem guide wall 33 defines an armature cavity 46 that is in direct flow communication with the supply/drain chamber 43 by pressure equalizing passage 47 that is radially offset relative to the axis of the bore defined by the bore forming the valve stem guide wall 33.

Fuel is supplied to the supply/drain chamber 43 and drained therefrom by means of a primary supply/drain passage 48 that includes a vertical passage, portion 48a in the main body portion 10a which at one end is in flow communication with supply/drain cavity 26 and which at its opposite end communicates with the upper end of an inclined passage portion 48b, the lower end of which opens through wall 34 into the supply/drain chamber 43. In addition, fuel can be supplied to the armature chamber 46 and drained therefrom by means of a secondary supply/drain passage 50 which includes a first passage portion 50a, which at one end is in flow communication with an annular groove 11a and bushing 11, and an inclined second passage portion 50b extending from the annular groove 11a to open through the upper surface of the side body portion 10b into the armature chamber 46.

Flow between the supply/drain chamber 43 and passage 30 is controlled by the solenoid 31 actuated control valve 32.

The control valve 32, in the form of a hollow poppet valve, includes an axially elongated head 55 having a conical valve seat surface 55a at one end thereof, a spring engaging, outward extending, radial flange 55b at its opposite end or lower end, and at least one radial passage 55c through the wall of the head intermediate these ends, and a stem 56 extending upward therefrom. The stem 56 includes an upper portion of a diameter to be reciprocally received in the valve stem guide wall 33 and a lower portion 56a of reduced diameter next adjacent to the valve seat surface 55a of head 55 having an axial extent so as to form with the valve stem guide wall 33, an annulus cavity 57 that is in communication with passage 30 during opening and closing movement of the control valve 32.

The control valve 32 is normally biased to an open position relative to the valve seat 36, the position shown in FIG. 1, by means of a spring 58, of predetermined force, that loosely encircles the main body portion of the valve head 55 and that has one end thereof in abutment against the radial flange 55b of the valve head. Movement of the control valve 32 to a valve closed position against the valve seat 36 is accomplished by means of a solenoid 31 actuated flat armature 60 that is loosely received in the armature cavity 56 and which is suitably secured to the upper valve stem 56 and of the control valve 32 by a hollow screw 61 threadingly engaged in the internally threaded upper free end of the valve stem 56.

As shown in FIG. 1, the armature 60 is thus loosely received in the complementary-shaped armature cavity 56 provided in the solenoid spacer 45 for movement relative to an associate pole piece 62 of the solenoid assembly 31.

The solenoid assembly 31 further includes a stator assembly, generally designated 63, having a flanged inverted cup-shaped solenoid case 64 which is secured by screws 65 to the upper surface of the side body portion 10b with the solenoid spacer 45 sandwiched therebetween.

Thus, during engine operation, fuel is supplied at a predetermined supply pressure by a pump to the injector 1 via the fuel passage 4 and cavity 5 in cylinder head 3 and through the filter 25 into the supply/drain cavity 26. Fuel thus supplied to the supply/drain cavity 26 can flow through passage 48 into the supply/drain chamber 43 and from this chamber 43 it can flow via the pressure equalizing passage 47 and also through the ports 55c and hollow armature control valve 32 and screw 61 into the armature cavity 46. In the construction shown in FIG. 1, fuel can also flow in either direction between the armature cavity 46 and the supply/drain cavity 26 via the drain passage 50.

With the solenoid coil 67 of solenoid 31 de-energized, the valve spring 58 will be operative to open and hold open the control valve 32 relative to the valve seat 36. Thus, during a suction stroke of the plunger 12, with the control valve 32 in its open position, fuel can now flow from the supply/drain chamber 43 through the annulus passage now defined between the valve seat surface 55a and valve seat 36 into the pump chamber 16.

Thereafter, during the pump stroke of the plunger 12, this downward pump stroke movement of the plunger will cause pressurization of the fuel within the pump chamber 16 and of the fuel in the passages 30 and discharge passage means 70 associated therewith. However, with the solenoid coil 67 still energized, this pressure can only rise to a level that is a predetermined amount less than the "pop" pressure required to lift the needle valve 80 against the force of its associate return spring 83.

During this period of time, the fuel displaced from the pump chamber 16 can flow via the passage 30 and the cavity 57 back to the supply/drain chamber 43 since the control valve 32 is still open.

Thereafter, during the continued downward stroke of the plunger 12, an electrical pulse of finite character and duration applied through suitable electrical conductors to the solenoid coil 67 produces an electromagnetic field attracting the armature 60 upward, from the position shown in FIG. 1, toward the pole piece 62.

This movement of the armature 60 as coupled will effect seating of the control valve 32 against its associate valve seat 36. As this occurs, the drainage of fuel from the pump chamber 16 via passage 30 in the manner described hereinabove will no longer occur. Without this spill of fuel from the pump chamber 16, the continued downward movement of plunger 12 will increase the pressure of fuel therein to a "pop" pressure level to effect unseating of the needle valve 80. This then permits the injection of fuel out through the spray orifices 82. As the coil is de-energized, the force of the valve spring 58 causes immediate unseating of the control valve 32 so as to allow spill fuel flow from the pump chamber 16 via the passages including passage 30 back to the supply/drain chamber 43. This spill flow of fuel thus releases the injection nozzle system pressure as in the discharge passage means so that the spring 83 can again effect seating of the injection valve 80.

With the prior art injector pump environment thus described, the methods for use in accordance with the present invention are described below.

Figure 2:
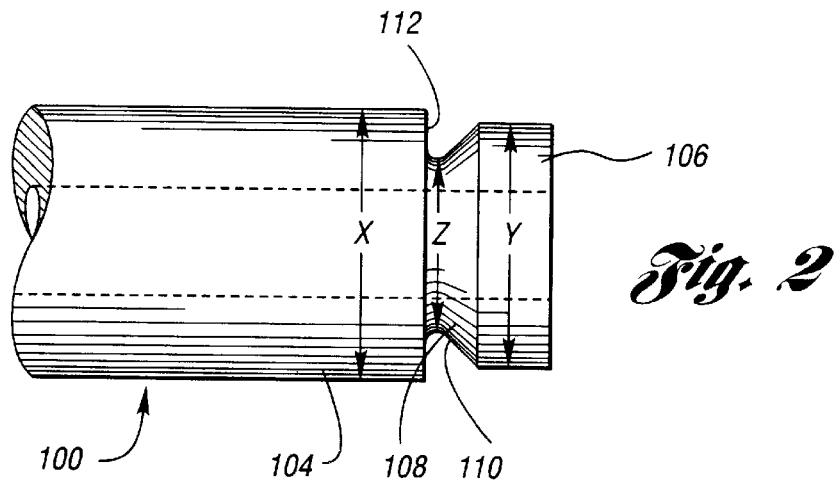
FIG. 2 shows a cut away side view of an upper valve stem for a control valve in accordance with the present invention.
Figure 3A:
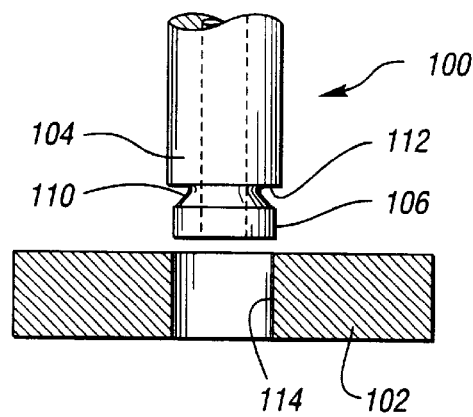
FIG. 3a shows the upper valve stem of FIG. 2 moving towards an armature plate.
Figure 3B:
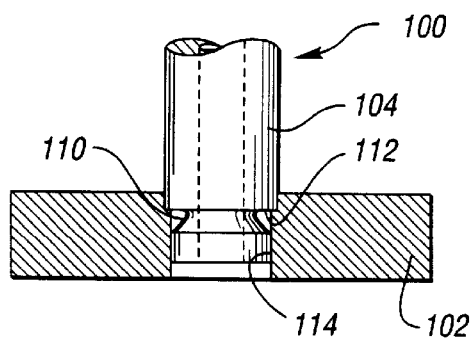
FIG. 3b shows the upper valve stem of FIG. 2 having its head portion inserted into the central aperture of the armature plate.
Figure 3C:
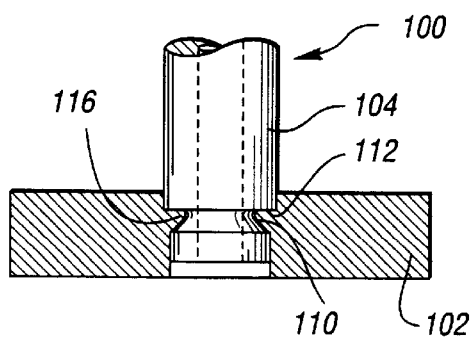
FIG. 3c shows the upper valve stem of FIG. 2 swaged into the armature plate.
Figure 4A:
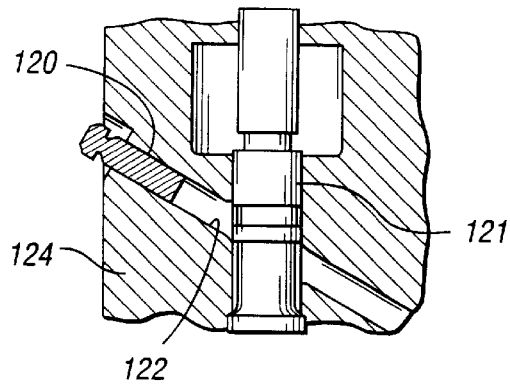
FIG. 4a shows a cut-away sectional schematic view of a plug with its shaft portion inserted into a fuel inlet passage.
Figure 4B:
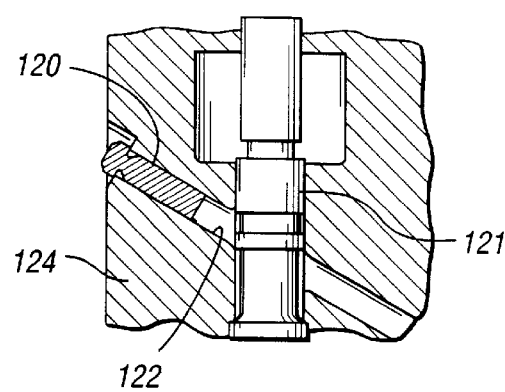
FIG. 4b shows a cut-away sectional schematic view of the plug inserted into the fuel flow passage prior to swaging.
Figure 4C:
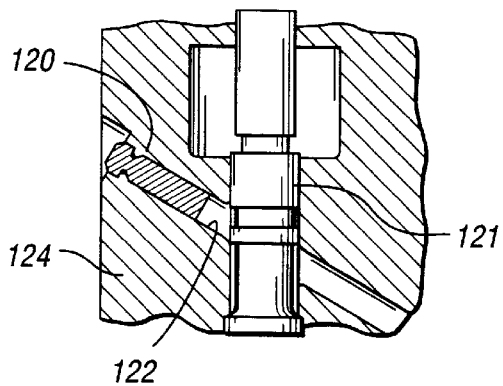
FIG. 4c shows a cut-away sectional schematic view of the plug with the plug head being initially punched into the body.
Figure 4D:
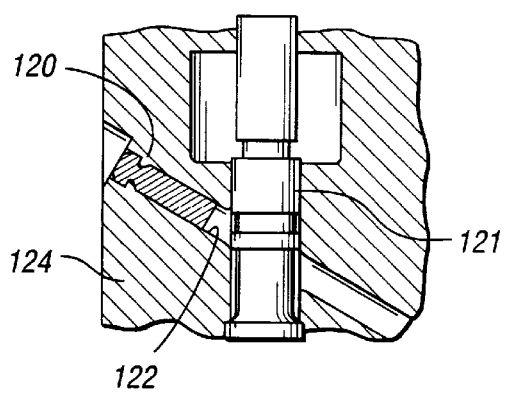
FIG. 4d shows a cut-away sectional schematic view of the plug inserted into the flow passage and a portion of the body being deformed into the annular groove.
Figure 4E:
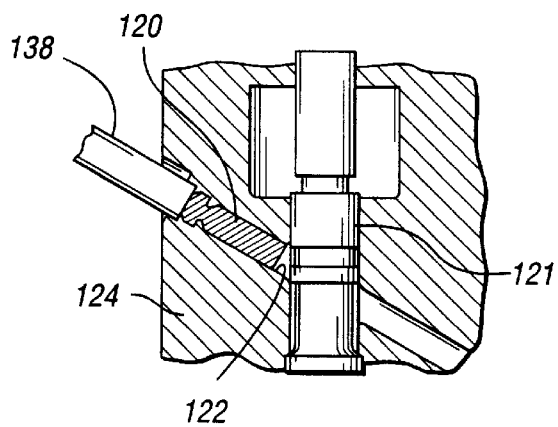
FIG. 4e shows a cut-away sectional schematic view of the plug punched further into the annular passage in a manner to deform a further portion of the body around the annular chamfer of the plug head.

Turning to FIG. 2, a control valve stem 100 for use in accordance with a first aspect of the present invention is shown. As opposed to being screwed to the armature plate, as shown in FIG. 1, the control valve stem 100 is swaged to the armature plate 102, as illustrated in FIGS. 3a–c. The control valve stem 100 includes a body 104 having a body width X, a head 106 with a head width Y narrower than the body width X, and a neck 108 with a neck width Z narrower than the head width Y. The neck 108 forms an annular groove 110 between the head 106 and body 104. The body 104 has a cross-sectional area approximately 20% greater than that of the head 106, and thus forms an annular edge 112 adjacent the neck 108.

The control valve stem 100 is preferably a tool steel, and the armature plate 102 is preferably a soft iron material. The armature plate 102 includes a central aperture 114 formed therethrough having a diameter sized for a slip-fit relationship with the head 106 of the control valve stem 100.

In order to swage the control valve stem 100 to the armature plate 102, the head 106 is first slid into the central aperture 114, as illustrated in FIGS. 3a–b. A hydraulic press is provided to force the control valve stem 100 further into the central aperture 114 of the armature plate 102. As illustrated in FIG. 3c, the control valve stem 100 is further forced toward the armature plate in a manner such that the annular edge 112 of the body 104 of the control valve stem deforms a portion 116 of the soft metal armature plate 102 into the annular groove 110 in a manner to secure the armature plate 102 to the stem 100.

In this manner, the attachment screw of the prior art assembly is replaced by a swaging attachment, so that the magnetic flux line interruption is eliminated to improve the flux.

A second aspect of the present invention is shown in FIGS. 4a–10. FIGS. 4a–e illustrate a method of plugging a fuel flow passage, such as supply/drain passage 30 of FIG. 1, in a fuel injector pump body in accordance with the present invention. The method comprises the steps of: (a) providing a plug 120; (b) inserting the plug 120 at least partially into the fuel flow passage 122 adjacent the control valve 121; and (c) swaging the plug 120 into the fuel flow passage 122 in a manner to deform a portion of the pump body 124 around the plug 120 to secure the plug 120 in the passage 122.

Figure 5:
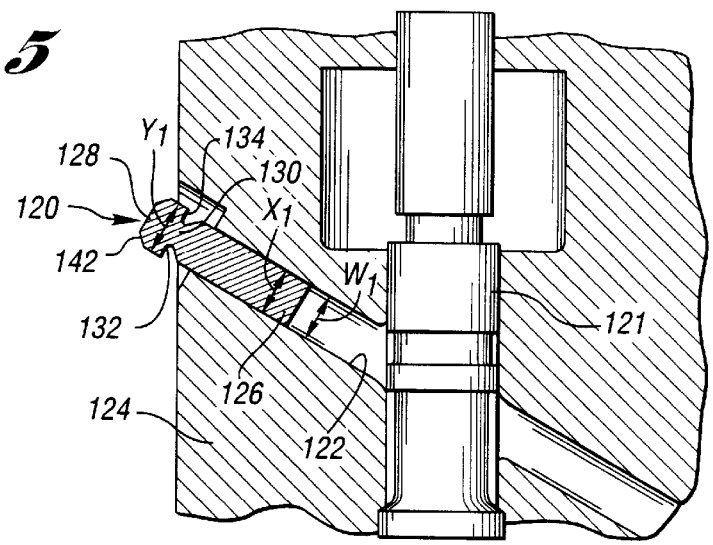

As clearly shown in FIG. 5, the plug 120 preferably includes a shaft portion 126 having a shaft width $X_1$, a head portion 128 having a head width $Y_1$ greater than the passage width $W_1$, and a neck portion 130 forming an annular groove 132 between the head and shaft portions 128,126. The head portion 128 forms an annular edge 134 therearound adjacent the neck portion 130.

The plug 120 is preferably a tool steel such as M10 or M50. The pump body 124 is preferably a deformable heat-treated steel.

Figure 6:
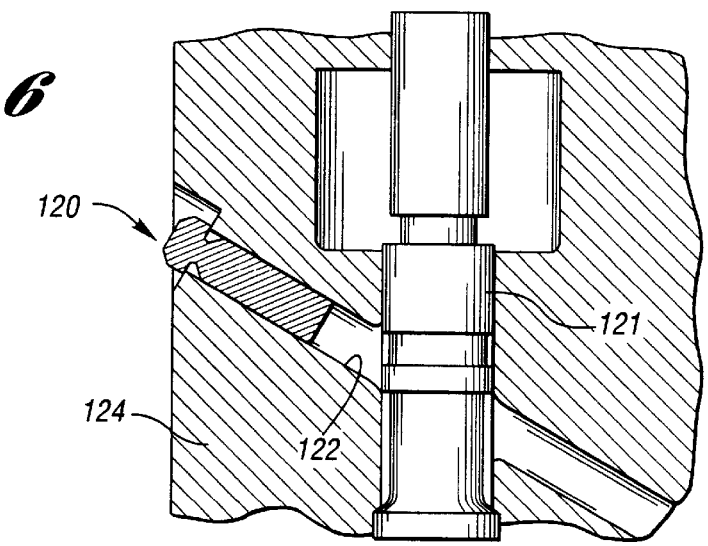
FIG. 6 shows an enlarged cut-away sectional schematic view of the assembly corresponding with FIG. 4b.

As shown in FIG. 5, the shaft portion 126 has a slip-fit relationship with the fuel flow passage 122 so that the shaft portion 126 may be slid into the passage 122 until the annular edge 134 of the head 128 abuts the pump body 124, as shown in FIG. 6. From the position shown in FIG. 6, the plug 120 is then forced further into the fuel flow passage 122. As the plug 120 is forced into the passage 122, the annular edge 134 deforms a portion 136 of the pump body 124 into the annular groove 132 to secure the plug 120 in the fuel flow passage 122, as shown in FIG. 7.

Figure 7:
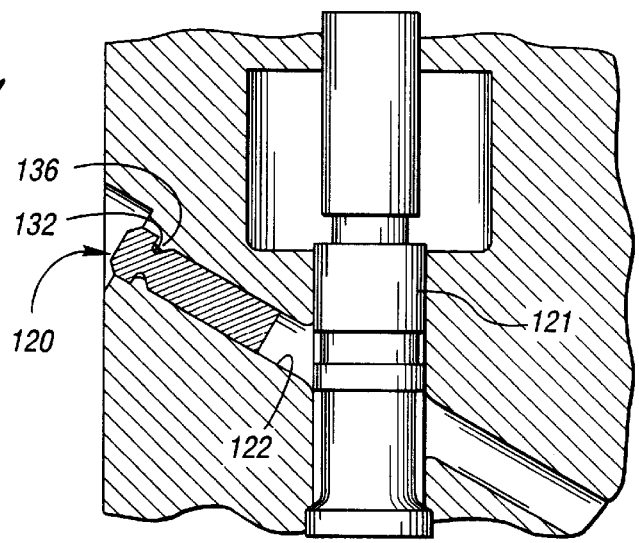
FIG. 7 shows an enlarged cut-away sectional schematic view of the assembly corresponding with FIG. 4c.
Figure 8:
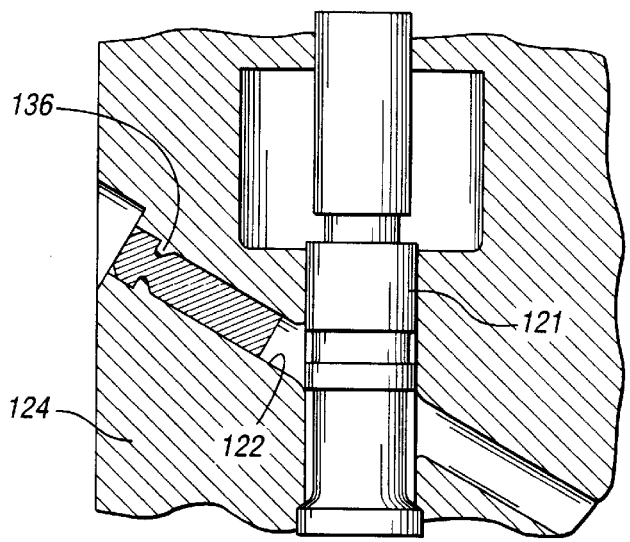
FIG. 8 shows an enlarged cut-away sectional schematic view of the assembly corresponding with FIG. 4d.

From the position illustrated in FIG. 7, the plug 120 is forced further into the passage 122, thus further deforming the portion 136 of the pump body 124 into the annular groove 132, as shown in FIG. 8.

Figure 9:
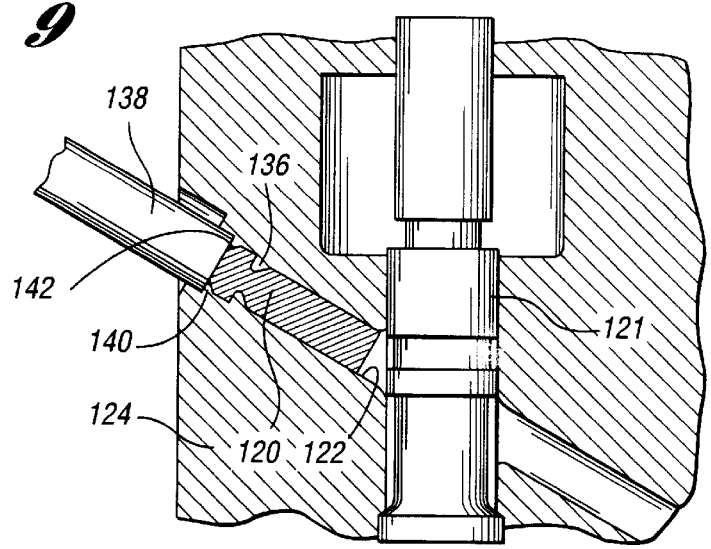
FIG. 9 shows an enlarged cut-away sectional schematic view of the assembly corresponding with FIG. 4e.

For further retention the plug 120 is forced further into the annular passage 122, as shown in FIG. 9. The punch 138 preferably has a cross-sectional area approximately 20% greater than that of the flow passage 122, so that the punch 138 engages and deforms a portion 140 of the pump body 124 around the annular chamfer 142 of the head portion 128 of the plug 120.

Figure 10:
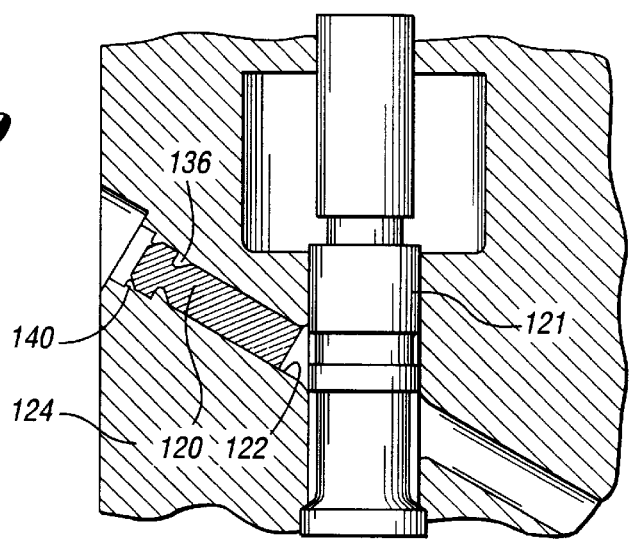
FIG. 10 shows an enlarged cut-away sectional schematic view of the final assembly after the punch is withdrawn from the position shown in FIG. 4e.

As shown in FIG. 10, the punch 138 is then withdrawn, and the deformed portions 136 and 140 of the pump body 124 secure the plug 120 in position within the passage 122.

Figure 11A:
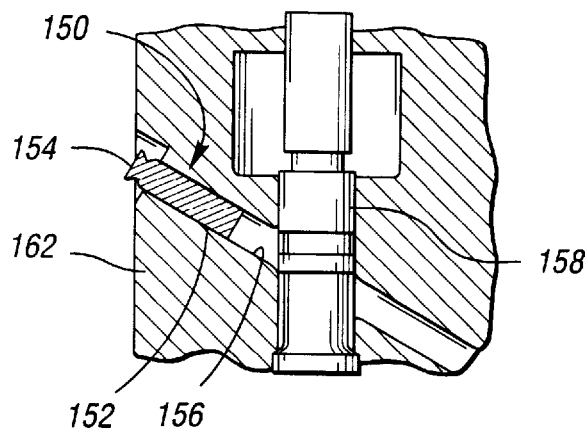
FIG. 11a shows a cut-away sectional schematic of an alternative plug inserted partially into the fuel flow passage.
Figure 11B:
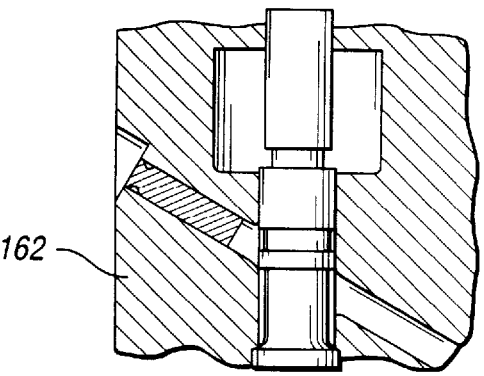
FIG. 11b shows a cut-away sectional schematic of the alternative plug fully inserted into the fuel flow passage.
Figure 11C:
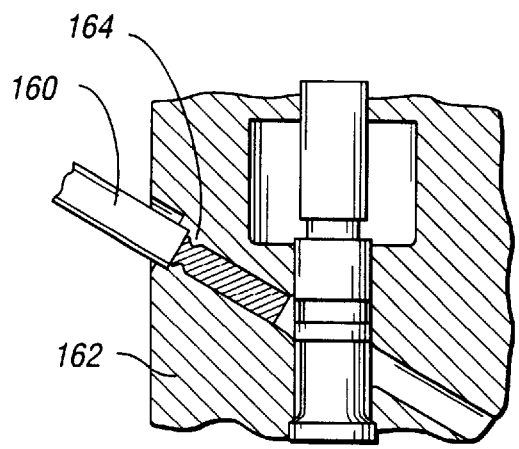
FIG. 11c shows a cut-away sectional schematic of the alternative plug punched into the fuel flow passage in a manner to deform a portion of the body into the annular groove.
Figure 11B:
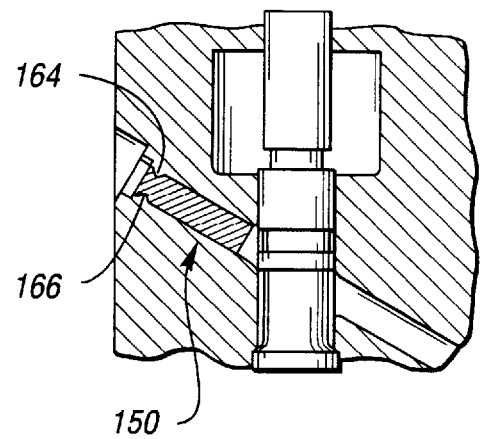
Figure 12:
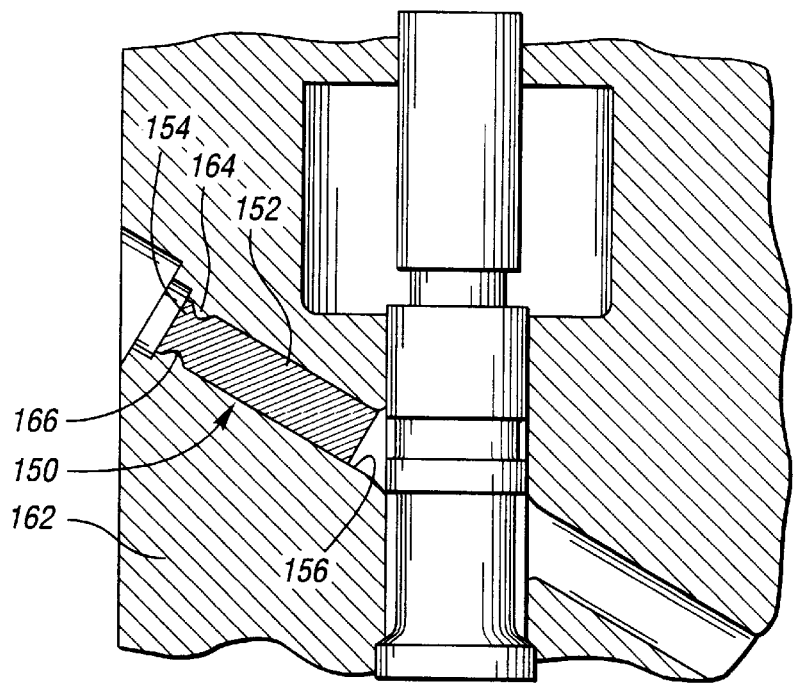
FIG. 12 shows an enlarged view of the assembly corresponding with FIG. 11d.

An alternative method of plugging a fuel flow passage is illustrated in FIGS. 11a through 12. In this embodiment, the plug 150 includes a shaft portion 152 and head portion 154 of substantially equal cross-sectional area. The shaft portion 154 and head portion 152 have a slip-fit relationship with the fuel flow passage 156. As shown in FIGS. 11a–d, the plug 150 is inserted into the passage 156 adjacent the control valve 158, and slid to a position where the head portion 154 is substantially flush with the opening of the passage 156. The punch 160, which has a cross-sectional area approximately 20% greater than that of the head portion 154, then engages the plug 150 and pump body 162, as shown in FIG. 11c, in a manner to deform a portion 164 of the pump body 162 into the annular groove 166 formed between the shaft and head portions 152,154, thereby securing the plug 150 within the passage 156.

Figure 13:
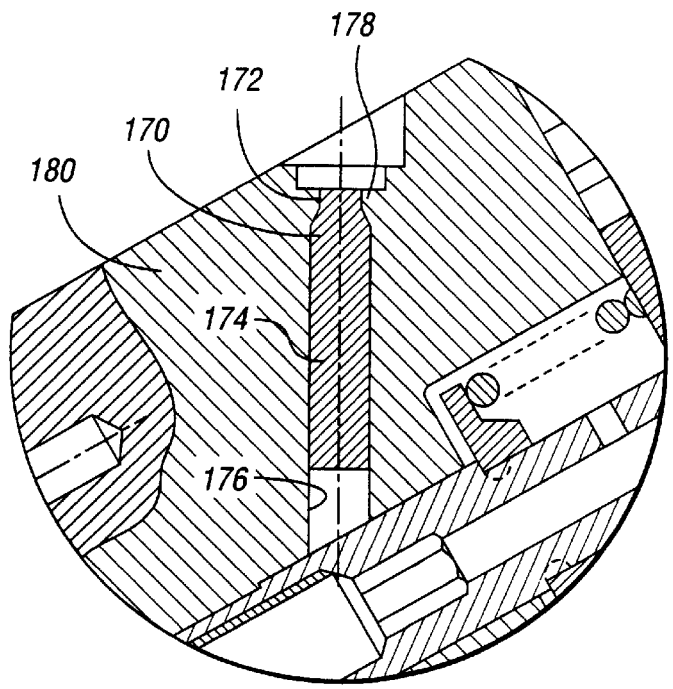
FIG. 13 shows a cut-away sectional view of a second alternative plug swaged into a fuel injector pump body fuel flow passage.

Yet another aspect of the present invention is illustrated in FIG. 13. FIG. 13 illustrates another method of plugging a fuel flow passage. In this embodiment, the plug 170 includes only a neck portion 172 and shaft portion 174. The plug 170 is inserted into the passage 176, and a portion 178 of the pump body 180 is deformed around the neck portion 172 by a punch in a manner to secure the plug 170 within the passage 176.

While the best modes for carrying out the invention have been described in detail, those familiar with the art to which this invention relates will recognize various alternative designs and embodiments for practicing the invention within the scope of the appended claims.

What is claimed is:

1. A method of plugging a fuel flow passage in a fuel injector pump body, the fuel flow passage having a passage width, the method comprising:

providing a plug having a shaft portion with a shaft width slightly less than the passage width, a head portion having a head width greater than the passage width, and a neck portion forming an annular groove between the head and shaft portion, said head portion forming an annular edge therearound adjacent the neck portion, and providing an annular chamfer on the head;

inserting the shaft portion into the passage; and swaging the plug into the passage by forcing the plug into the passage in a manner to cause the annular edge to deform a portion of the pump body into the annular groove to secure the plug in the passage.

2. The method of claim 1, further comprising:

providing a punch having a punch width greater than the head width; and forcing the punch toward the plug in a manner to deform a further portion of the body around the annular chamfer to further secure the plug in the passage.

3. A method of plugging a fuel flow passage in a fuel injector pump body, the fuel flow passage having a passage width, the method comprising:

providing a plug having a shaft portion with a shaft width slightly less than the passage width, a head portion having a head width greater than the passage width, and a neck portion forming an annular groove between the head and shaft portions, said head portion forming an annular edge therearound adjacent the neck portion and further forming an annular chamfer therearound;

inserting the shaft portion into the passage;

providing a punch having a punch width greater than the head width; and forcing the punch toward the plug in a manner to cause the annular edge to deform a portion of the pump body into the annular groove, and further to cause the punch to deform a further portion of the body around the annular chamfer to secure the plug in the passage.

* * * * *